United States Patent [19]

Eslambolchi

[11] Patent Number: 5,703,682

[45] Date of Patent: Dec. 30, 1997

[54] METHOD FOR MONITORING FIBER OPTIC CABLE

[76] Inventor: Hossein Eslambolchi, 24 Hartley La., Basking Ridge, N.J. 07920

[21] Appl. No.: 738,371

[22] Filed: Oct. 25, 1996

[51] Int. Cl.$^6$ ............................................. G01N 21/00
[52] U.S. Cl. ........................ 356/73.1; 356/348; 359/110
[58] Field of Search ........................... 356/73.1, 348; 359/110; 364/481

[56] References Cited

U.S. PATENT DOCUMENTS 5,541,725  7/1996  Lieber et al. ...................... 356/73.1
5,579,145  11/1996  Bogdau et al. ..................... 356/73.1
5,615,011  3/1997  Boisrobert et al. ................. 356/345

*Primary Examiner*—Frank G. Font
*Assistant Examiner*—Reginald A. Ratliff
*Attorney, Agent, or Firm*—Robert B. Levy

[57] ABSTRACT

Possible microbending of individual fibers ($14_1$ and $14_2$) within a fiber optic cable (12) is detected by monitoring each fiber as well as each piece of equipment ($16_1$, $16_2$, $18_1$ and $18_2$) connected to it. Should there exist multiple failed fibers under the condition that the equipment pieces associated with each failed fiber are operational; then a possible microbending condition is signaled.

6 Claims, 1 Drawing Sheet

METHOD FOR MONITORING FIBER OPTIC CABLE

TECHNICAL FIELD

This invention relates to a technique for monitoring fiber optic cables to detect failure caused by possible microbending.

BACKGROUND ART

Providers of telecommunications services now utilize fiber optic cables to carry both short haul and long haul optically-formatted telecommunication traffic. AT&T, for example, presently maintains thousands of miles of fiber optic cables within its network. The fiber optic cables maintained by telecommunication service providers, such as AT&T, traverse many different types of terrain. Within urban areas, fiber optic cables often pass through steel or PVC ducting buffed underground. In other environments, ducting structures carry fiber optic cables across bridges, roads, underpasses, etc. In some instances, fiber optic cables are buffed directly, with no surrounding ducting.

Many of the fiber optic cables deployed in the manner described are exposed to the ambient temperature. When the temperature is low, especially during winter months, any water that collects at low points within ducting carrying one or fiber optic cables tends to freeze, causing ice to build up. The build up of ice within the ducting tends stress individual fibers within one or more of the cables in the ducting causing, microbending of the fibers and possible failure. If a fiber falls, the equipment to which the fibers likewise falls.

Often, only a few of the fibers in a cable may fall due to microbending. Still, the failure of a small number of fibers will trigger equipment failure. Troubleshooting under such circumstances is often difficult because the failure of a few fibers in a cable due to microbending usually appears as equipment failure, even though the trouble actually lies with the cable.

This, there is a need for a technique for monitoring fiber optic cables to detect microbending of fibers in a fiber optic cable.

BRIEF SUMMARY OF THE INVENTION

Briefly, in accordance with the invention, a technique is provided to monitoring microbending of fibers within a fiber optic cable comprising part of a system that includes a plurality of pain of first and second pieces of equipment. Each pair of equipment pieces is linked by a separate fiber. To detect possible fiber microbending, an alarm monitor checks the operability of pair of equipment pieces associated with a particular fiber. If either of the first and second pieces of equipment of the pair is not operational, then the monitor sets an indicator to reflect the inoperability of the particular piece of equipment. Simultaneously, each fiber in each cable is monitored to determine its operability. A determination is then made whether multiple fibers within a cable have failed when there is no indicator that either the first and second pieces of equipment associated with a corresponding one of the multiple failed fibers is in operative. If multiple failed fibers exit, then the alarm monitor generates an alarm condition indicating possible microbending.

DETAILED DESCRIPTION

Figure 1:
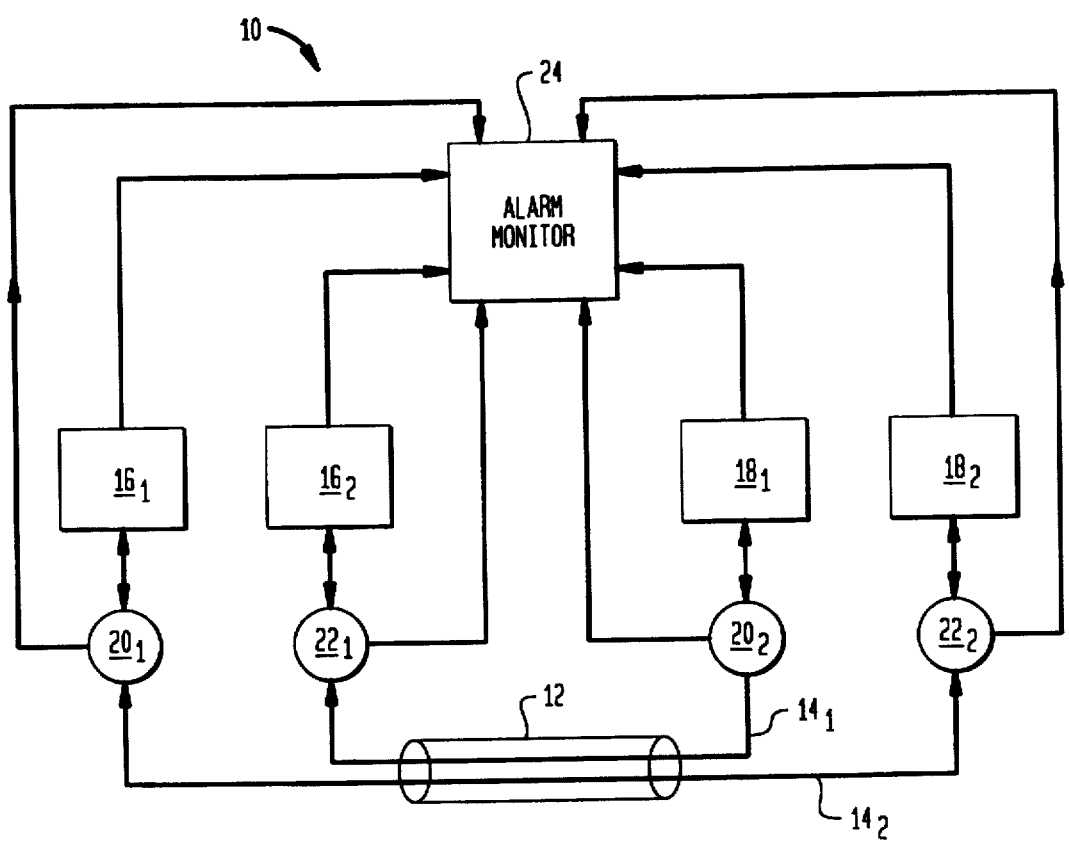
FIG. 1 depicts a block schematic diagram of a fiber-optic transmission system that includes a fiber optic cable that may be monitored in accordance with the present invention.

FIG. 1 illustrates a fiber-optic transmission system 10 that comprises at least one fiber optic cable 12 containing a plurality of individual fibers, identified as $14_1$ and $14_2$, for carrying optically formatted information. While the cable 12 is depicted as containing two individual fibers $14_1$ and $14_2$, it should be understood that a larger or smaller number of fibers is possible. Each of the fibers $14_1$ and $14_2$ couples one of a pair of first equipment pieces $16_1$ and $16_2$, respectively, to one of a pair of second equipment pieces $18_1$ and $18_2$, respectively. Each of the first and second equipment pieces $16_1$ and $16_2$ and $18_1$ and $18_2$, respectively, may comprise one of a variety of different types of electronic equipment capable of transmitting and/or receiving optically formatted information. For example, the first equipment pieces $16_1$ and $16_2$ may each comprise a subscriber loop carrier system for aggregating telecommunications traffic, whereas each of the second pieces of equipment $18_1$ and $18_2$ may comprise a switch for routing telecommunications traffic.

In the illustrated embodiment, only one of fibers $14_1$ and $14_2$ links one of the pairs of first and second equipment pieces $16_1$ and $18_1$, and $16_2$ and $18_2$, respectively. In some instances, multiple fibers (not shown) may link each first equipment piece to a second equipment piece. However, for ease of simplicity, only a single fiber link is depicted.

Depending on environmental conditions, the cable 12 containing the fibers $14_1$ and $14_2$ may run underground in ducting (not shown) traversing the right-of-way between the equipment pieces $16_1$ and $16_2$ and the equipment pieces $18_1$ and $18_2$. In some instances, all or part of the cable 12 may run above ground. Depending on the environment, water may collect in low spots within the ducting carrying the cable 12. In colder climates, the water collecting in the duct will freeze, giving rise to a build-up of ice that can stress the fibers $14_1$ and $14_2$ within the cable 12, causing fiber microbending. Ultimately, such microbending can lead to fiber failure. In many instances, only some of the fibers in the cable 12 may suffer from microbending, making trouble shooting difficult because failure of a few fibers in the cable may appear as an equipment failure.

In accordance with the invention, a technique is provided for detecting possible microbending. To detect microbending, each of fiber monitoring devices $20_1$ and $20_2$ is situated proximate a separate one of the ends of the fiber $14_1$ to monitor the optically formatted information entering and exiting the fiber. Likewise, each of monitoring devices $22_1$ and $22_2$ is situated proximate a separate one of the ends of the fiber $14_2$ to monitor the optically formatted information entering and exiting the fiber. By monitoring the optically formatted information entering and exiting each of the fibers $14_1$ and $14_2$, the operability of each fiber may be checked. Information from each of the monitoring devices $20_1$ and $20_2$ and $22_2$ and $22_2$ passes to a central alarm monitor 24, typically a personal computer or programmable logic controller, as are well known in the art.

To monitor the operability of the fibers $14_1$ and $14_2$, two monitoring devices are required, one at or near each end of each fiber. This is because the first and second equipment pieces $16_1$ and $18_1$ and $16_2$ and $18_2$ associated with the fibers $14_1$ and $14_2$, respectively, are typically bi-directional. In other words, the first and second equipment pieces $16_1$ and $18_1$ and $16_2$ and $18_2$ each receives and transmits optically formatted information. Only a single monitoring device would be needed for each of fibers $14_1$ and $14_2$ if only one of the first equipment pieces $16_1$ and $16_2$ originated optically formatted information while each of the second pieces $18_1$ and $18_2$ received such information or vice versa.

Each of the first and second equipment pieces $16_1$ and $16_2$, and $18_1$ and $18_2$ typically includes internal detecting devices (not shown) for observing the operability of the equipment piece. The internal detecting devices within the equipment pieces $16_1$ and $16_2$, and $18_1$ and $18_2$ are coupled to the central alarm monitor 24. The fiber monitoring devices $20_1$, $20_1$, $22_1$ and $22_2$ could be incorporated within the equipment pieces $16_1$, $16_2$, $18_1$ and $18_2$, respectively, either as separate units, or as part of the detecting devices within each piece of equipment for monitoring its operability.

To detect possible microbending, the alarm monitor 24 continuous monitors each of the equipment pieces $16_1$ and $16_2$, and $18_1$ and $18_2$ to determine if any piece is malfunctioning. If so, the alarm monitor 24 sets an internal indicator or flag associated with that equipment piece to indicate that it has malfunctioned. At the same time, the alarm monitor 24 monitors the individual fibers $14_1$ and $14_2$ via the monitoring devices $20_1$ and $20_2$, and $22_1$ and $22_2$, respectively. A detected failure of one of the fibers $14_1$ and $14_2$ may be attributable to an actual fiber malfunction due to microbending. Even though the fiber itself may be operating properly, the failure of one of the equipment pieces $16_1$ and $16_2$, and $18_1$ and $18_2$ will result in a loss of information carried by fiber associated with that equipment piece. Thus, the fiber monitoring devices $20_1$ and $20_2$, and $22_1$ and $22_2$ will signal a malfunctioning fiber when an equipment piece associated with the monitored fiber has failed even though the fiber has not actually malfunctioned.

To eliminate equipment failure as a possible source of fiber malfunction indication, the alarm monitor 24 determines whether a malfunction indication of one of the fibers $14_1$ and $14_2$ is accompanied by a malfunction indication of an associated piece of equipment. Thus, if the fiber $14_1$ registers a malfunction indication, the alarm monitor 24 determines whether either of the equipment pieces 16 and $18_1$ has malfunctioned. If neither of the equipment pieces $16_1$ and $18_1$ has malfunctioned, then a malfunction indication of the fiber $14_1$ is attributable to the fiber itself.

Microbending typically affects more than one fiber, although not necessarily all fibers in the cable 12. Hence, a possible microbending condition is present if there are multiple malfunctioning fibers in the same cable. Therefore, the alarm monitor 24 determines whether there are multiple failed fibers for a given cable under the condition when both pieces of equipment associated with each potentially failed have exhibited no malfunctions. In other words, the alarm monitor 24 determines how many of the fibers $14_1$ and $14_2$ register a malfunction under the condition when neither of the equipment pieces associated with each failed fiber registers a malfunction. If there are multiple failed fibers, each associated with a pair of functioning equipment pieces, then the alarm monitor 24 generates an alarm condition indicating possible microbending. Upon the occurrence of such an alarm condition, a technician can be dispatched to inspect the failed fibers. Knowing that the alarm condition occurred as a consequence of microbending, the technician can concentrate his or her search in regions where microbending is most likely to occur, thus saving repair time.

In making generating an alarm condition indicating possible microbending, the alarm monitor 24 may take into account the location of the cable 12, as well as time of year. For example, if the cable 12 were situated in a northern climate, multiple failed fibers likely to be the result of microbending is likely to occur during winter months. Conversely, microbending is far less likely during summer months, especially when the cable lies in a warm climate.

The foregoing discloses a technique for monitoring a fiber optic cable 12 to detect possible microbending of fibers $14_1$ and $14_2$ by determining whether there are multiple failed fibers under the condition when the equipment pieces $16_1$ and $16_2$, and $18_1$ and $18_2$ coupled to the fibers are operating properly.

It is to be understood that the above-described embodiments are merely illustrative of the principles of the invention. Various modifications and changes may be made thereto by those skilled in the art which will embody the principles of the invention and fall within the spirit and scope thereof.

What is claimed is:

1. Within a system comprising at a plurality of pairs of first and second pieces of equipment, each pair of pieces of equipment coupled by one of a plurality of fibers in at least one fiber optic cable, a method for monitoring said cable, the method comprising the steps of:

detecting if each of the first and second pieces of equipment of each pair is operational, and if not setting an indicator to designate the inoperability of said piece of equipment;

simultaneously monitoring each fiber in each cable associated with a pair of first and second pieces of equipment;

determining whether multiple fibers in one of cables has failed under the condition when no indicator is designated for either of the first and second pieces of equipment of the pair associated with one of said multiple failed fibers, and if so generating an alarm condition indicating possible stress to the fiber optic cable associated with microbending.

2. The method according to claim 1 wherein each fiber is monitored by detecting optically formatted information present at one end of the fiber.

3. The method according to claim 1 Wherein each fiber is monitored by detecting optically formatted information present at both ends of the fiber.

4. The method according to claim 1 wherein the location of the cable is considered in connection with generating the alarm condition.

5. The method according to claim 1 wherein the time of year is considered in connection with generating the alarm condition.

6. The method according to claim 1 further including the step of dispatching a technician upon the occurrence of an alarm condition.

* * * * *

UNITED STATES PATENT AND TRADEMARK OFFICE
CERTIFICATE OF CORRECTION

PATENT NO. : 5,703,682
DATED : December 30, 1997
INVENTOR(S) : Eslambolchi

It is certified that error appears in the above-identified patent and that said Letters Patent is hereby corrected as shown below:

On the title page, insert item [73] Assignee: -- AT&T Corp., New York, New York --

Signed and Sealed this

Tenth Day of August, 1999

*Attest:*

Q. TODD DICKINSON

*Attesting Officer*          Acting Commissioner of Patents and Trademarks